United States Patent [19]

Higuchi et al.

[11] Patent Number: 4,732,699

[45] Date of Patent: Mar. 22, 1988

[54] BIPHENYL CARBONIC ACID ESTER COMPOUNDS AND LIQUID CRYSTAL COMPOSITION CONTAINING THE SAME

[75] Inventors: Ryoichi Higuchi, Tokyo; Takao Sakurai, Kawasaki; Naoko Mikami, Yokohama; Kiriko Akaiwa, Tokyo; Koji Takeuchi, Yokohama, all of Japan

[73] Assignee: Ajinomoto Co., Inc., Tokyo, Japan

[21] Appl. No.: 878,798

[22] Filed: Jun. 26, 1986

[30] Foreign Application Priority Data

Jul. 1, 1985 [JP] Japan .................................. 60-144136
Jan. 28, 1986 [JP] Japan .................................. 61-16060

[51] Int. Cl.$^4$ .................... G02F 1/13; C07C 69/96; C09K 19/12
[52] U.S. Cl. .................... 252/299.66; 252/299.5; 252/299.01; 350/350 R; 350/350 S; 558/265; 558/268; 558/270; 558/273
[58] Field of Search ........... 252/299.66, 299.5, 299.01; 350/350 S, 350 R; 558/265, 266, 268, 270, 273

[56] References Cited

U.S. PATENT DOCUMENTS

| | | | |
|---|---|---|---|
| 4,576,732 | 3/1986 | Isogai et al. | 252/299.66 |
| 4,589,996 | 5/1986 | Inoue et al. | 252/299.64 |
| 4,592,858 | 6/1986 | Higuchi et al. | 252/299.66 |
| 4,596,667 | 6/1986 | Inukai et al. | 252/299.66 |
| 4,613,209 | 9/1986 | Goodby et al. | 252/299.66 |
| 4,614,609 | 9/1986 | Inoue et al. | 252/299.66 |
| 4,615,586 | 10/1986 | Geary et al. | 252/299.01 |
| 4,695,651 | 9/1987 | Higuchi et al. | 252/299.67 |

FOREIGN PATENT DOCUMENTS

| | | | |
|---|---|---|---|
| 136725 | 4/1985 | European Pat. Off. | 252/299.66 |
| 152217 | 8/1985 | European Pat. Off. | 252/299.67 |
| 174816 | 3/1986 | European Pat. Off. | 252/299.66 |
| 178647 | 4/1986 | European Pat. Off. | 252/299.67 |
| 3525015 | 1/1986 | Fed. Rep. of Germany | 252/299.66 |
| 58-13546 | 1/1983 | Japan | 252/299.66 |
| 59-219251 | 12/1984 | Japan | 252/299.63 |
| 60-199856 | 10/1985 | Japan | 252/299.6 |
| 61-22051 | 1/1986 | Japan | 252/299.64 |
| 61-68449 | 4/1986 | Japan | 252/299.66 |

OTHER PUBLICATIONS

Goodby, J. W., et al, Liquid Crystals & Ordered Fluids, vol. 4, Plenum Press, N.Y., pp. 1–32 (1984).

Primary Examiner—Teddy S. Gron
Attorney, Agent, or Firm—Oblon, Fisher, Spivak, McClelland & Maier

[57] ABSTRACT

A liquid crystal compound represented by the following general formula (1), which possess a large spontaneous polarization about room temperature and a liquid crystal composition containing a liquid crystal compound represented by the following general formula (1)

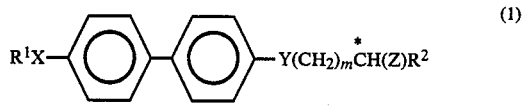

(1)

wherein $R^1$ represents $C_{6-14}$ alkyl group, $R^2$ represents straight or branched alkyl group with or without optically active carbon, X represents a group selected from —OCOO—, —O—, —COO—, —OCO— or single bond, Y represents a group selected from —COOCH$_2$—, —OCO— or —OCOO—, in which either X or Y is at least —OCOO— group, m represents 0 or 1, Z represents a chlorine or bromine, a carbon atom marked with * represents optically active carbon atom.

4 Claims, 3 Drawing Figures

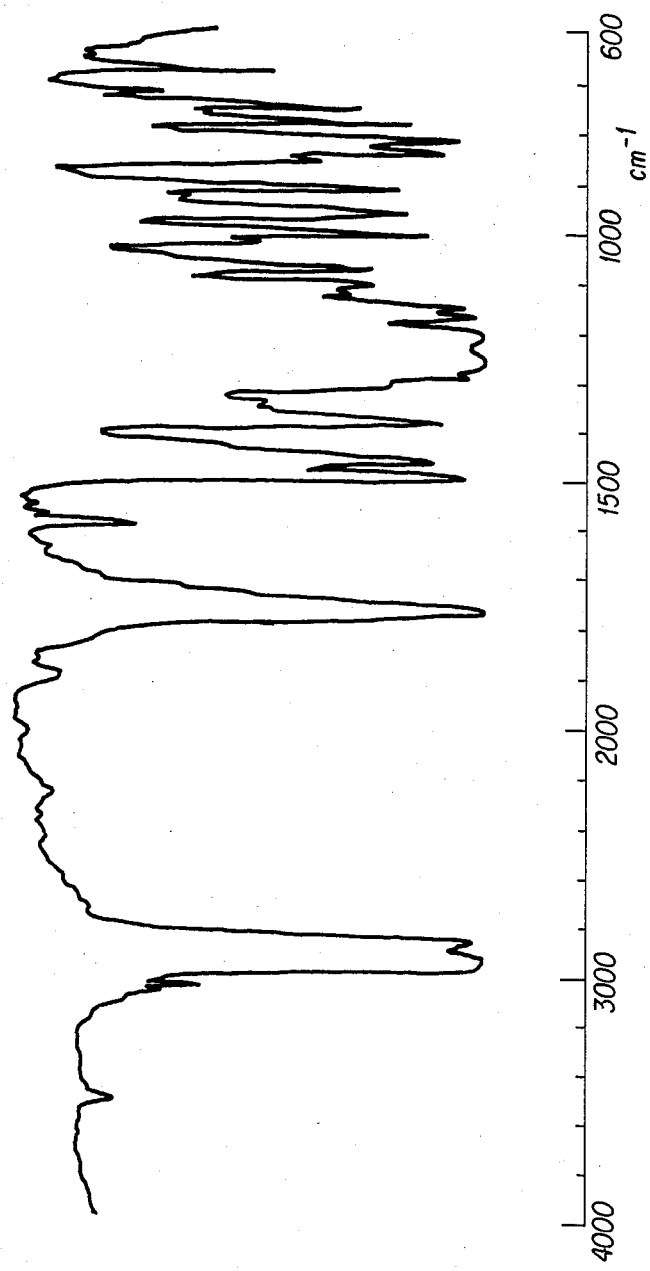
FIG. 2 IR SPECTRUM

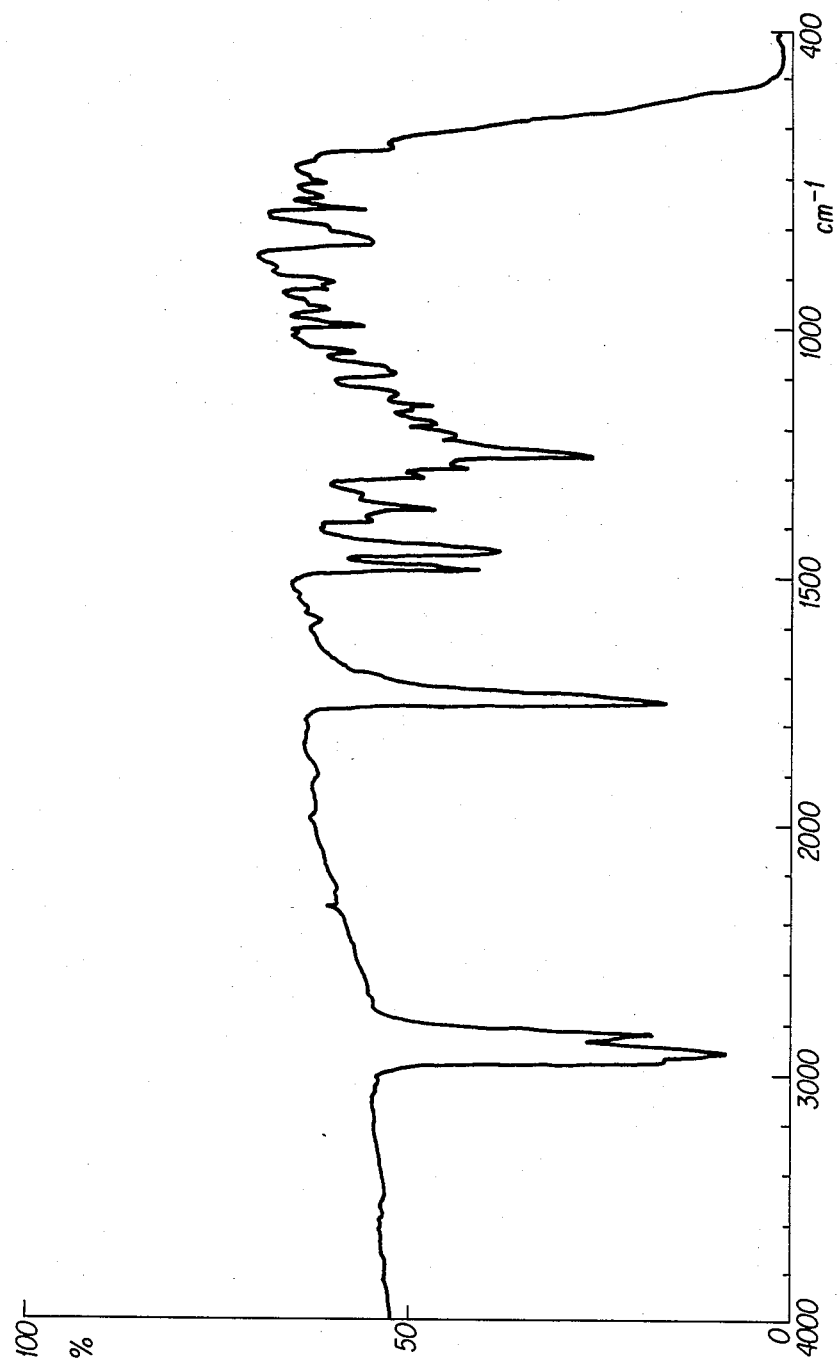
FIG. 3 IR SPECTRUM

BIPHENYL CARBONIC ACID ESTER COMPOUNDS AND LIQUID CRYSTAL COMPOSITION CONTAINING THE SAME

BACKGROUND OF THE INVENTION (1) Field of the Invention

This invention relates to new liquid-crystal compounds and to liquid crystal compositions containing the same, particularly smectic liquid crystal compositions.

The liquid-crystal compounds herein include those compounds which are useful as a component of liquid crystal compositions even though they do not exist in the form of liquid crystal.

(2) Description of the Related Art

Twisted nematic (TN) and dynamic scatter (DS) types, both employing nematic liquid crystal cells, are the modes of liquid-crystal display most extensively used at present. One disadvantage of conventional nematic liquid crystal cells is low response speeds (on the order of milliseconds at the highest), which limit the use of this type of liquid crystal cells.

It has recently been found that higher response speeds can be achieved by smectic liquid crystal cells and that some of optically active smectic compounds are ferroelectric. The ferroelectric liquid crystals are a group of compounds which are ferroelectric when they exist as chiral smectic C (hereinafter abbreviated as "SmC*") phase and are typified by 2-methylbutyl 4-(4-n-decyloxybenzylideneamino)cinnamate (hereinafter abbreviated as "DOBAMBC") of the following structural formula [J. Physique, 39, L-69 (1975)],

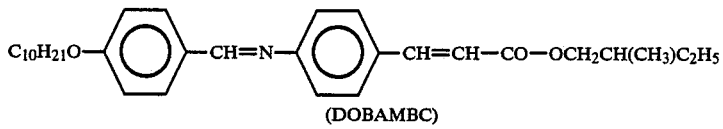

(DOBAMBC)

More recently N. A. Clark et al. [Appl. Phys. Lett., 36, 89 (1980)] found that very high response speeds on the order of microseconds can be achieved by thin-film DOBAMBC cells. Since then ferroelectric liquid crystals have been receiving attention not only as a material for display in liquid-crystal TV sets, but also as an element for optoelectronics devices (e.g., photo printer heads, optical Fourier transformation elements, and light valves).

DOBAMBC remains ferroelectric only within a relatively narrow temperature range, and is unsatisfactory in physical and chemical stability because it is a Schiff base. Hence there has been a great demand for new ferroelectric compounds which are stable both physically and chemically, remain ferroelectric over a wide temperature range, have large dielectric constant, and can be driven at a low voltage.

SUMMARY OF THE INVENTION

Accordingly, one object of the present invention is to provide a stable smectic liquid crystal compound which possess a large spontaneous polarization about room temperature and a liquid crystal composition containing said liquid crystal compound.

Briefly, this object and other objects of the invention as hereinafter will become readily apparent can be attained by a liquid crystal of the formula (1):

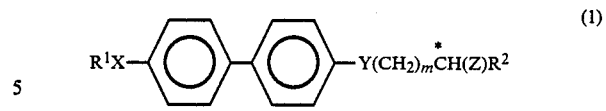

wherein $R^1$ represents $C_{1-18}$ alkyl group, $R^2$ represents straight or branched alkyl group or aralkyl group with or without optically active carbon, X represents a group selected from —OCOO—, —O—, —COO—, —OCO— or single bond, Y represents a group selected from —COOCH$_2$—, —OCO— or —OCOO—, in which either X or Y is at least —OCOO— group, m represents 0 or 1, Z represents a chlorine or bromine, a carbon atom marked with * represents optically active carbon atom.

BRIEF DESCRIPTION OF THE DRAWINGS

FIGS. 2 and 3 show infrared spectra of the crystal compound of the present invention, (2R,3S)-2-chloro-3-methylpentanoic acid-4'-(4"'-octyloxycarbonyloxyphenyl) phenyl ester and (2S,3S)-4-(4'-octylcarbonyloxyphenyl)phenyl-2-chloro-3-methylpentyloxycarboxylic acid ester.

DETAILED DESCRIPTION OF THE PREFERRED EMBODIMENTS

Figure 1:
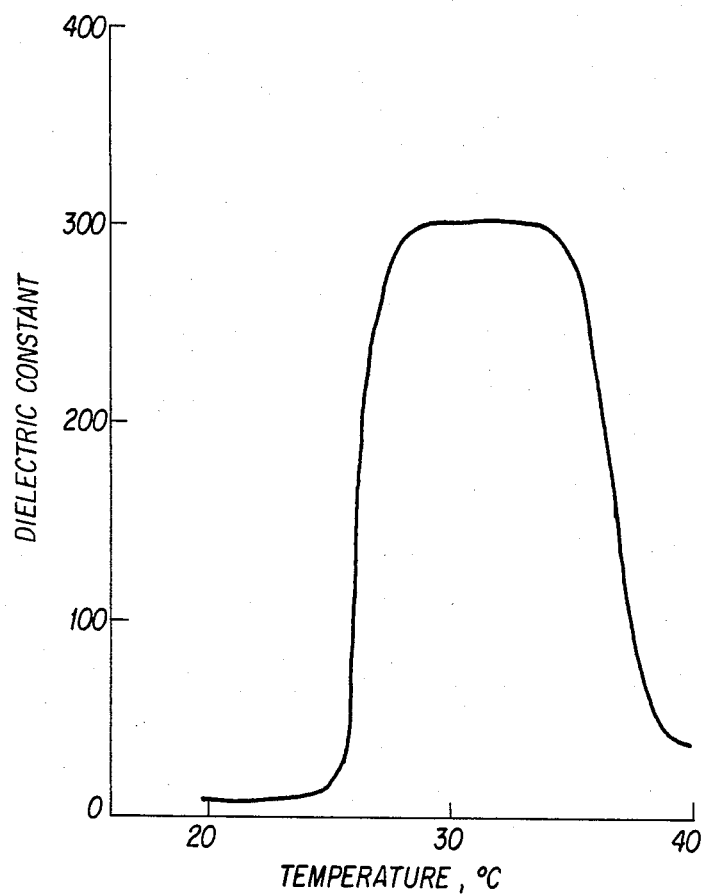
FIG. 1 is the graphical representation of the relationship between the temperatures and the dielectric constant values of embodiments of the liquid crystal compound of the present invention, (2R,3S)-2-chloro-3-methyl-pentanoic acid-4'-(4"'-octyloxycarbonyloxyphenyl) phenyl ester.

In the present invention, smectic liquid crystal compounds having $C_{6-14}$ of $R^1$ represented by supra general formula (1) is defined especially as a compound which shows a smectic C phase or any smectic phase under appropriate conditions.

The compounds of this invention show ferroelectricity. In addition, these compounds may be combined with a substance which is not ferroelectric, thereby lowering the ferroelectric temperature range without affecting the ferroelectric characteristics.

The compounds of this invention that are optically active may also be added to nematic liquid-crystal compound for White-Tayler type color display, for display of cholesteric/nematic conversion type, and to prevent formation of reversed domain in TN type cells.

It is also possible to use the compounds of the invention, which are smectic liquid-crystal compounds, as memory-type display element for thermal and laser writing.

As mentioned supra, many ferroelectric liquid crystals are known, but a ferroelectric liquid crystal (2R,3S)-2-chloro-3-methylpentanoic acid-4'-(4"'-octyloxycarbonyloxyphenyl)phenyl ester, which shows chemical stability, a large spontaneous polarization up to 236 nC/cm$^2$ and good enantiomerism, was not yet known.

One of the compound of formula (2) can be presented according to the following steps, (a) or (b):

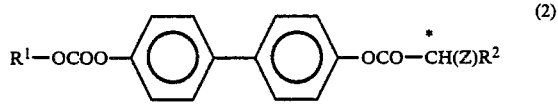

wherein $R^1$ represents $C_{1-18}$ alkyl group, $R^2$ represents straight or branched alkyl group or aralkyl group with or without optically active carbon, Z represents a chlorine or bromine, a carbon atom marked with * represents optically active carbon atom, (a-1) reacting of alkoxycarbonic chloride with 4,4'-biphenol, (a-2) dehydration of 4-alkyloxycarbonyloxyphenyl phenol and alkylcarboxylic acid halide in nonactive solvents such as carbontetra chloride by using a dehydrating agent such as dicyclohexylcarbodiimide, or (b) reacting of halogen-alkylcarboxylic acid chloride and 4-alkyloxycarbonyloxyphenyl phenol in basic solvent such as pyridine.

Further one of the compound of formula (3) can be presented according to the following steps (c):

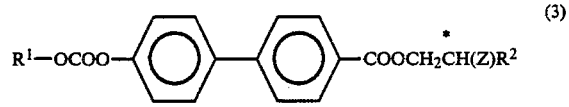

wherein $R^1$ represents $C_{1-18}$ alkyl group, $R^2$ represents straight or branched alkyl group or aralkyl group with or without optically active carbon, Z represents a chlorine or bromine, a carbon atom marked with * represents optically active carbon atom.

(c-1) Alkoxycarboxylic acid chloride was reacted with 4,4'-hydroxybiphenylcarboxylic acid to obtain alkoxycarbonyloxyphenylbenzoic acid.

(c-2) Then the obtained compound was reacted with thionyl chloride to obtain acid chloride.

(c-3) Acid chloride reacted with alcoholic halide in pyridine solvent to obtain the compound of formula (3).

Optically active groups represented by $Y(CH_2)_m\overset{*}{C}H(Z)R^2$ in the above-mentioned general formula (1) are useful especially for ferroelectronic liquid crystal composition. The optically active groups are easily derived from, for example, the following optically active alcohols or optically active carboxylic acids;

2-methylbutanol, 3-methylpentanol, 4-methylhexanol, 2-butanol, 2-pentanol, 2-hexanol, 2-heptanol, 3-hexanol, 2-octanol, 1-phenylethanol, p-(2-methylbutyl)-phenol, linalool, narolidol, carbeol, cholesterol, 2-halo-2-phenylethanol, 2-phenyl-3-halo-1-propanol, 3-phenyl-2-halo-1-propanol, 1-phenyl-2-halo-1-propanol, 3-halo-2-methyl-1-propanol, 1,1,1-trihalo-2-propanol-2-halo-1-butanol, 3-halo-1-butanol, 2,3-dihalo-1-butanol, 2,4-dihalo-1-butanol, 3,4-dihalo-1-butanol, 1,1,1-trihalo-2-butanol, 4,4,4-trihalo-3-halo-1-butanol, 2,3,4-trihalo-1-butanol, 3,3,4,4,4-pentahalo-2-butanol, 2-halo-3-methyl-1-butanol, 2-halo-3,3-dimethyl-1-butanol, 2-halo-1-pentanol, 3-halo-1-pentanol, 4-halo-1-pentanol, 2,4-dihalo-1-pentanol, 2,5-dihalo-1-pentanol, 1,1,1-trihalo-2-pentanol, 1,1,1,2,2-pentahalo-3-pentanol, 2-halo-3-methyl-1-pentanol, 2-halo-4-methyl-1-pentanol, 2-halo-3-monohalomethyl-4-methyl-1-pentanol, 2-halo-1-hexanol, 3-halo-1-hexanol, 4-halo-1-hexanol, 5-halo-1-hexanol, 2,5-dihalo-1-hexanol, 2,6-dihalo-1-hexanol, 1,1,1-trihalo-2-hexanol, 2,5,6-trihalo-1-hexanol, 2-halo-1-heptanol, 1,1,1-trihalo-2-heptanol, 2-halo-1-octanol, 1,1,1-trihalo-2-octanol.

2-halo-2-phenylethanoic acid, 3-halo-2-methylpropanoic acid, 2-phenyl-3-halopropanoic acid, 3-phenyl-2-methylpropanoic acid, 2-phenyl-3-halopropanoic acid, 2-halobutanoic acid, 3-halobutanoic acid, 2,3-dihalobutanoic acid, 2,4-dihalobutanoic acid, 3,4-dihalobutanoic acid, 4,4,4-trihalo-3-halobutanoic acid, 2,3,4-trihalobutanoic acid, 2-halo-3-methylbutanoic acid, 2-halo-3,3-dimethylbutanoic acid, 2-halopentanoic acid, 3-halopentanoic acid, 4-halopentanoic acid, 2,4-dihalopentanoic acid, 2,5-dihalopentanoic acid, 2-halo-4-methylpentanoic acid, 2-halo-3-methylpentanoic acid, 2-halo-3-monohalomethyl-4-methylpentanoic acid, 2-halohexanoic acid, 3-halohexanoic acid, 4-halohexanoic acid, 5-halohexanoic acid, 2,5-dihalohexanoic acid, 2,6-dihalohexanoic acid, 2,5,6-trihalohexanoic acid, 2-haloheptanoic acid, 2-halooctanoic acid, 2-phenylpropanoic acid, 2-phenylbutanoic acid, 3-phenyl-2-methylpropanoic acid, 2-methylbutanoic acid, 2,3-dimethylbutanoic acid, 2,3,3-trimethylbutanoic acid, 2-methylpentanoic acid, 3-methylpentanoic acid, 2,3-dimethylpentanoic acid, 2,4-dimethylpentanoic acid, 2,3,3,4-tetramethylpentanoic acid, 2-methylhexanoic acid, 3-methylhexanoic acid, 4-methylhexanoic acid, 2,5-dimethylhexanoic acid, 2-methylheptanoic acid, 2-methyloctanoic acid, 2-trihalomethylpentanoic acid, 2-trihalomethylhexanoic acid, 2-trihalomethylheptanoic acid (wherein halo represents chlorine, bromine and iodine).

Some of the optically active alcohols just mentioned can be easily prepared by asymmetric reduction ketones with metal catalyst, microorganisms or enzyme. Some other optically active alcohols may be derived from optically active amino acids or oxy acids which are found in nature or obtainable by optical resolution. And some of the optically active carboxylic acid just mentioned can be prepared by oxidation of alcohol or deamination of alcohol. Some other optically active carboxylic acids may be derived from optically active amino acids or optically active oxy acid which are found in nature or obtainable by optically resolution such as alanine, valine, leucine, isoleucine, phenylalanine, serine, threonine, allo-threonine, homoserine, allo-isoleucine, tert-leucine, 2-aminobutyric acid, norvaline, norleucine, ornitine, lysine, hydroxylysine, phenylglycine, trifluoalanine, aspartic acid, glutanic acid, lactic acid, mandelic acid, tropic acid, 3-hydroxybutyric acid, malic acid, tartaric acid and isopropylmalic acid.

Examples

The following Examples further illustrate this invention but are not intended to limit its scope.

The phase transition temperature values in the following description may be varied slightly in dependence on the method of measurements or the purity of the products.

Hereinafter following words are abbreviated as in ( ); crystal (C), chiral smectic C (SC*), chiral smectic I phase (SI), nondetected chiral smectic phase (SX), smectic A (SA), chiral smectic F (F*), chiral nematic (N*), isotropic phase (I) and carbon atom marked with * shows an asymmetric carbon atom.

EXAMPLE 1

Preparation and properties of (2R,3S)-2-chloro-3-methylpentanoic acid-4'-(4''-octyloxycarbonyloxyphenyl)phenyl ester (A)

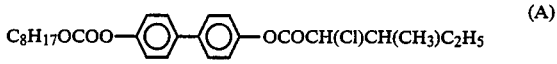
(A)

Forty seven grams of 4,4'-biphenol were dissolved with 20 ml of pyridine. 25 ml of octyloxycarboxylic acid chloride were added in the solution with stirring, after 2 hours; the mixture was neutralized with hydrogen chloride. Then crude 4-(4'-octyloxycarbonyloxyphenyl)phenol was extracted with chloroform from the neutral solution. The crude compounds were purified by passing through silica-gel column.

One gram of 4-(4'-octyloxycarbonyloxyphenyl)-phenol, 0.7 g of dicyclohexylcarbodiimide, 0.5 g of (2R,3S)-2-chloro-3-methylpentanoic acid and 4-pyrrolidinopyridine as catalyzer were all dissolved with 60 ml of carbon tetrachloride and allowed to stand for overnight. Then the crystals and solvent were removed, the residue were purified by passing through silica-gel column and then recrystallized with hexane to obtain 1 g of the compound (A).

IR spectrum of the compound (A) was shown in FIG. 2.

To measure the dielectric constant by bridge method, the compound (A) was set in a cell, which was formed between two nesa glasses as electrodes by using spacer of 25 μm thick of polyethyleneterephthalate film, and a voltage with 100 Hz of alternative current was applied between said electrodes. The result was shown in FIG. 1. It is obvious that the value of the dielectric constant of the compound (A) was much larger than that of DOBAMBC. The other hand, the electric constant of the compound (A) measured by Sawyer-Tower method, using said cell, applying a voltage 300 Hz between said electrodes was 236 nC/cm². The value means the excellent spontaneous polarization and was one of the largest dielectric constant among the known smectic liquid crystals.

In the case of applying a voltage with square wave to the compound, electro-photo-effects such as clear contrast and high speed response corresponding to the square wave were observed through making a microscopic observation.

EXAMPLE 2

Preparation and properties of (S)-2-chloro-3-methylbutyl-4-(4'-nonyloxycarbonyloxy)-biphenylcarbonic acid ester (B)

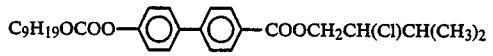
(B)

Ten grams of 4(4'-hydroxy)-biphenylcarboxylic acid was dispersed in 120 ml of carbontetrachloride and 50 ml of pyridine. 17 ml of nonanic acid chloride was dropped into the mixture with reflux-stirring. After heating for three hours, reducing the solvents and then a small amount of water was added to decompose unreacted nonanic acid chloride. The residue was washed with methanol to obtain 11.5 g of 4-(4'-nonyloxycarbonyloxy)biphenylcarboxylic acid (C). 9.0 g of the compound (C) was dispersed in 200 ml of carbontetrachloride. Then 10 ml of thionylchloride was dropped into the solution with reflux-stirring and reacting for three hours. After reducing the solvent, 4-(4'-nonyloxycarbonyloxy)biphenylcarboxylic acid chloride (D) was obtained. 1.0 g of the compound (D) was dissolved with 60 ml of carbontetrachloride and 5 ml of pyridine. 0.4 g of (S)-2-chloro-3-methylbutanol was added to the solution with stirring and cooling and then allowed to stand overnight. After removing the crystals and solvents, the residue was purified by passing through silica-gel column, 0.7 g of the compound (B) was obtained after recrystallizing the product with hexane.

The compound (B) was smectic liquid crystal having SC* phase and SA phase. The phase transition temperature of (B) were shown in table I.

EXAMPLE 3

The compounds of the present invention prepared by the similar methods in example 1 and 2 and its phase transition points were shown in table 1.

EXAMPLE 4

Preparation and properties of (2S,3S)-4-(4'-octylcarbonyloxyphenyl)phenyl-2-chloro-3-methylpentyloxycarboxylic acid ester (E)

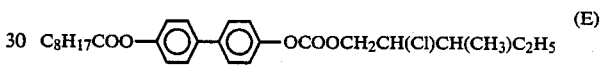
(E)

Forty seven grams of 4,4'-biphenol were dissolved with 20 ml of pyridine with stirring, then 25 ml of octylcarboxylic acid was added. After reacting for two hours, the solution was neutralized with hydrogen chloride. The crude product of 4-(4'-octylcarbonyloxyphenyl)phenol was extracted with chloroform from the solution. The crude product was purified by passing through silica-gel column.

1 g of 4-(4'-octylcarbonyloxyphenyl)phenol and 0.5 g of (2S,3S)-2-chloro-3-methylpentyloxycarboxylic acid were dissolved with mixture solvent, 60 ml of carbontetrachloride and 10 ml of pyridine and then the mixture was allowed to stand overnight. The crude product was purified by passing through silica-gel column, after reducing crystals and solvents, then product was recrystallized with ethanol to obtain 1.0 g of the compound (E).

IR spectrum of the compound (A) was shown in FIG. 3. The compound was smectic liquid crystal having SC* phase and its phase transition points were shown in table II.

To measure the dielectric constant by bridge method, the compound (E) was set in a cell described in example 1. The electro-photo-effects of the compound (E) concerning clear constant and high speed response corresponding to the square were observed through making a microscopic observation by applying a voltage with square wave.

EXAMPLE 5

Preparation and properties of other smectic liquid crystals

The other smectic liquid crystals were obtained by same procedure as example 4 with using phenol derivatives instead of 4-(4'-octylcarbonyloxyphenyl)-phenol.

The phase transition points of smectic liquid crystals were shown in table II.

In the following table I and II, a black circle (●) shows each that the compound forms the phase corresponding to an abbreviated word described above and the results measured under condition at raising temperature and the lower them show results measured under condition at decreasing temperature. The carbon atom marked with * represents optically active carbon which is S form and the carbon atom with ** means R form.

TABLE I

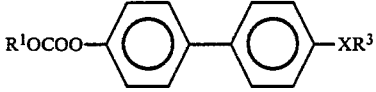

$R^1OCOO-\bigcirc-\bigcirc-XR^3$

| n | X | $R^3$ | C | SI* | SC* | I |
|---|---|---|---|---|---|---|
| 8 | —OCO— | —CH(Cl)—CH(CH$_3$)$_2$ <br> * | ● <br> ● | | | 59 ● <br> 58 ● |
| 8 | —OCO— | —CH(Cl)—CH(CH$_3$)—C$_2$H$_5$ <br> *  * | ● <br> ● | 14 ● <br> 14 ● | 24 ● <br> 24 ● | 41 ● <br> 41 ● |
| 8 | —OCO— | —CH(Cl)—CH(CH$_3$)—C$_2$H$_5$ <br> **  * | ● <br> ● | 22 ● <br> 22 ● | 25 ● <br> 25 ● | 37 ● <br> 37 ● |
| 8 | —OCO— | —CH(Cl)—CH$_2$—CH(CH$_3$)$_2$ <br> * | ● <br> ● | 20 ● <br> 12 ● | 22 ● <br> 22 ● | 34 ● <br> 34 ● |
| 8 | —OCO— | —CH(Cl)—C$_2$H$_5$ <br> * | ● <br> ● | <br> 62 ● | 70 ● <br> 70 ● | 80 ● <br> 80 ● |
| 9 | —OCO— | —CH(Cl)—CH(CH$_3$)$_2$ <br> * | ● <br> ● | 50 ● <br> 50 ● | 55 ○ <br> 55 ● | 58 ● <br> 58 ● |
| 9 | —OCO— | —CH(Cl)—CH(CH$_3$)—C$_2$H$_5$ <br> *  * | ● <br> ● | 25 ● <br> 25 ● | 27 ● <br> 27 ● | 43 ● <br> 43 ● |
| 9 | —OCO— | —CH(Cl)—CH(CH$_3$)—C$_2$H$_5$ <br> **  * | ● <br> ● | 15 ● <br> 15 ● | 25 ● <br> 25 ● | 39 ● <br> 39 ● |

| n | X | $R^2$ | C | SI* | SC* | I |
|---|---|---|---|---|---|---|
| 9 | —OCO— | —CH(Cl)—CH$_2$—CH(CH$_3$)$_2$ <br> * | ● <br> ● | <br> 0 ● | 21 ● <br> 22 ● | 35 ● <br> 35 ● |
| 9 | —COO—CH$_2$— | —CH(Cl)—CH(CH$_3$)$_2$ <br> * | ● <br> ● | | <br> 33 ● | 60 ● <br> 36 ● | upper black circle and figures in a same column show

TABLE II

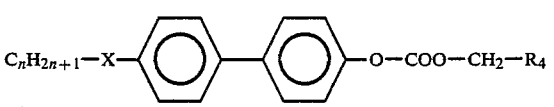

$C_nH_{2n+1}-X-\bigcirc-\bigcirc-O-COO-CH_2-R_4$

| n | X | $R_4$ | C | SX | SI* | SC* | I |
|---|---|---|---|---|---|---|---|
| 6 | —COO— | —CH(Cl)—CH(CH$_3$)—C$_2$H$_5$ <br> *  * | ● <br> ● | | | 42 ● | 53 ● <br> 49 ● |
| 8 | —COO— | —CH(Cl)—CH(CH$_3$)—C$_2$H$_5$ <br> *  * | ● <br> ● | | 30 ● | 46 ● <br> 46 ● | 53 ● <br> 53 ● |
| 9 | —COO— | —CH(Cl)—CH(CH$_3$)—C$_2$H$_5$ <br> *  * | ● <br> ● | | | 44 ● | 54 ● <br> 54 ● | 56 ● <br> 56 ● |
| 8 | —O— | —CH(Cl)—CH(CH$_3$)—C$_2$H$_5$ <br> *  * | ● <br> ● | | | | 43 ● <br> 43 ● | 50 ● <br> 50 ● |
| 8 | —O—COO— | —CH(Cl)—CH(CH$_3$)—C$_2$H$_5$ <br> *  * | ● <br> ● | | | | | 64 ● <br> 52 ● |
| 12 | —O—COO— | —CH(Cl)—CH(CH$_3$)—C$_2$H$_5$ <br> *  * | ● <br> ● | | | | | 66 ● <br> 47 ● |
| 5 | —OCO— | —CH(Cl)—CH(CH$_3$)—C$_2$H$_5$ <br> *  * | oil condition | | | | |

TABLE II-continued

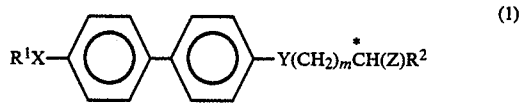

| n | X | R₄ | Phase transition point [°C.] | | | | |
|---|---|---|---|---|---|---|---|
| | | | C | SX | Sl* | SC* | I |
| 8 | —OCO— | —CH(Cl)—CH(CH₃)—C₂H₅ | • | | | | 48 • |
| | | * * | • | | | | 44 • |

What is claimed is:

1. A liquid crystal compound represented by the following general formula (1):

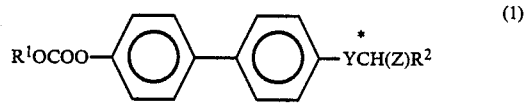

wherein $R^1$ represents $C_{6-14}$ alkyl group, $R^2$ represents straight or branched alkyl group with or without optically active carbon, X represents a group selected from —OCOO—, —O—, —COO—, —OCO— or single bond, Y represents a group selected from —COOCH₂—, —OCO— or —OCOO—, in which either X or Y is at least —OCOO— group, m represents 0 or 1, Z represents a chlorine or bromine, a carbon atom marked with * represents optically active carbon atom.

2. A liquid crystal compound as described in claim 1, wherein X is —OCOO— group, $R^2$ is straight or branched $C_{1-4}$ alkyl group with or without optically active carbon, m is 0.

3. A liquid crystal compound as described in claim 1, wherein Y is —OCOO—, m is 1, $R^2$ is straight or branched $C_{1-4}$ alkyl group with or without optically active carbon.

4. A liquid crystal composition containing a smectic liquid crystal compound represented by the following general formula (1) as a component:

$$R^1OCOO-\bigcirc-\bigcirc-\overset{*}{Y}CH(Z)R^2 \quad (1)$$

wherein $R^1$ represents $C_{6-14}$ alkyl group, $R^2$ represents straight or branched alkyl group with or without optically active carbon, Y represents a group selected from —COOCH₂—, —OCO— or —OCOO—, m represents 0 or 1, Z represents a chlorine or bromine, a carbon atom marked with * represents optically active carbon atom.

* * * * *